United States Patent
Yazaki et al.

(10) Patent No.: US 6,920,109 B2
(45) Date of Patent: Jul. 19, 2005

(54) PACKET SHAPER

(75) Inventors: Takeki Yazaki, Hachioji (JP); Takeshi Aimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 09/811,504

(22) Filed: Mar. 20, 2001

(65) Prior Publication Data

US 2002/0093910 A1 Jul. 18, 2002

(30) Foreign Application Priority Data

May 17, 2000 (JP) ........................................ 2000-149811

(51) Int. Cl.$^7$ ................................................ H04J 1/16
(52) U.S. Cl. ................. 370/230.1; 370/230; 370/235.1
(58) Field of Search ............................ 370/230–235.1, 370/412, 395.42

(56) References Cited

U.S. PATENT DOCUMENTS

| | | | |
|---|---|---|---|
| 5,434,848 A | * 7/1995 | Chimento et al. | .......... 370/232 |
| 5,546,389 A | 8/1996 | Wippenbeck et al. | |
| 5,959,991 A | 9/1999 | Hatono et al. | |
| 6,104,700 A | * 8/2000 | Haddock et al. | ............ 370/235 |
| 6,560,230 B1 | * 5/2003 | Li et al. | ................. 370/395.42 |
| 6,687,225 B1 | * 2/2004 | Kawarai et al. | .......... 370/230.1 |
| 6,757,249 B1 | * 6/2004 | Kejriwal et al. | .......... 370/235.1 |

FOREIGN PATENT DOCUMENTS

| | | |
|---|---|---|
| JP | 7-95212 | 4/1995 |
| JP | 11-55278 | 2/1999 |

* cited by examiner

*Primary Examiner*—Duc Ho
*Assistant Examiner*—Lee Khuong
(74) *Attorney, Agent, or Firm*—Mattingly, Stanger, Malur & Brundidge, P.C.

(57) ABSTRACT

When a packet arrives at a shaping unit 500, a discard control unit 510 judges whether to "store" or "discard" the arrived packet. Packets judged to be "stored" are stored into a packet storage FIFO buffer 520 and sent out within a transmission bandwidth greater than the total sum of user-by-user minimum bandwidths. A bandwidth check unit 600 checks bandwidth per user and judges packets that fall within the bandwidth to be high priority packets and packets that fall outside the bandwidth to be low priority packets. If a large quantity of packets are stored into the packet storage FIFO buffer 520, the discard control unit 510 determines that low priority packets are exclusively "discarded," thus securing high priority packets from being discarded. Thereby, the shaping unit 500 ensures proper packet transmission within user-specific minimum bandwidth.

12 Claims, 9 Drawing Sheets

PACKET SHAPER

BACKGROUND OF THE INVENTION

1. Field of the Invention

The present invention relates to packet shapers that shape packets to transmission bandwidth.

2. Description of Related Art

In a packet mode communication method used for internets, because packets from many users can be transmitted in common over a same transmission line, the transmission cost per bandwidth can be decreased. Meanwhile, internet users have made a demand that Quality of Service (QoS) such as reduced delay time and a low packet discard rate that were implemented for conventional telephone networks and corporate private networks should also be implemented in internet operation.

Guaranteed minimum bandwidth service, one QoS implementation service, is such that the carrier guarantees packet transmission within minimum bandwidth assigned by contract to each user (contractor with the carrier) and transfers packets in excess of the minimum bandwidth as long as the network resources permit them.

Figure 2:
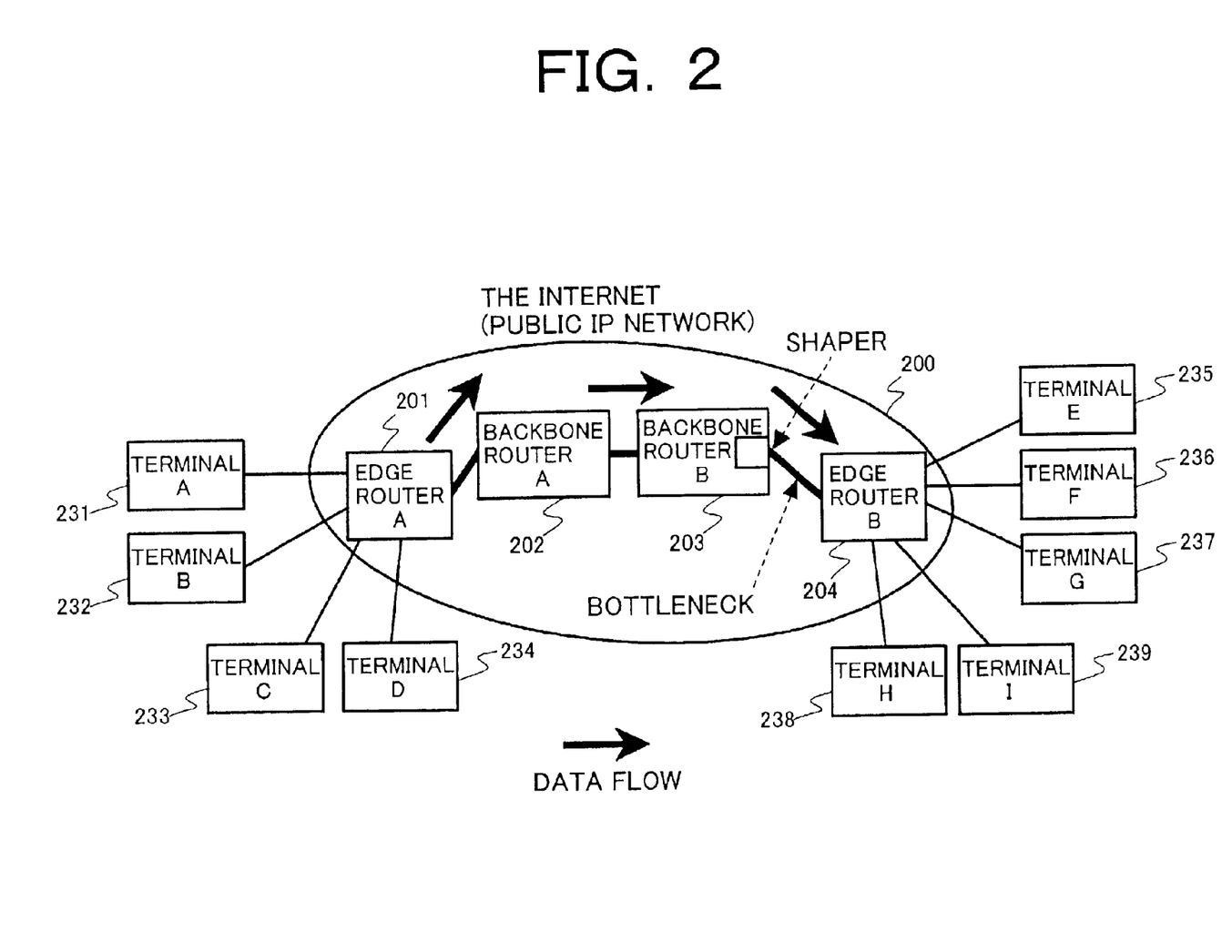
FIG. 2 is a diagram showing network architecture.

In an internet 200, for example, as shown in FIG. 2, the guaranteed minimum bandwidth service is provided. Assume that five terminals (terminal E 235, terminal F 236, terminal G 237, terminal H 238, and terminal I 239) that are directly connected to an edge router B 204 surely receive packets within terminal-specific minimum bandwidth that has been assigned by contract to user E, user F, user G, user H, and user I, respectively. Traffic sent from terminal A 231, terminal B 232, terminal C 233, and terminal D 234 that are directly connected to an edge router A 201 is transferred via the edge router 201, a backbone router A 202, a backbone router 203, and the edge router B 204 to the terminal E 235, terminal F 236, terminal G 237, terminal H 238, and terminal I 239. If a line from the backbone router B 203 to the edge router B 204 is bottlenecking, the backbone router B 203 has a packet shaper for the line and ensures that traffic falling within the minimum bandwidth specific to each user is transferred to its destination.

As a scheduling method of the packet shaper that ensures packet transmission within minimum bandwidth, for example, the scheduling method called Weighted Fair Queuing (WFQ) is known. An algorithm of WFQ, called Self Clocked Fair Queuing (SCFQ) is described by S. Golestani, A Self-Clocked Fair Queuing Scheme for Broadband Applications, In proc. of INFORCOM94, pp. 636–646, 1994. Previous packet shapers of related art have a plurality of queues i (where i=1 to N) and each queue i has weight Wi and variable Fi in proportion to the bandwidth in use. When a packet arrives at the packet shaper, the variable Fi is updated. When sending out a packet, the first packet is output for service from the queue i with the minimum variable Fi among the variables Fi of the first packets in the queues i in which packets are stored. Variable Fi update is executed, according to the following equation:

$$Fi = L/Wi + \max(Fi, V(ta))$$

where, L is length of an arrived packet, ta is time of arrival of the packet, V(t) is a function that returns a value of the packet variable Fi of queue i at time t. In this scheme, for packets from queue i, the minimum bandwidth for Wi/(total sum of values of Wi)×line bandwidth is ensured.

SUMMARY OF THE INVENTION

The previous packet shapers of related art have two problems. The first problem is that high-speed shaping is impossible when the number of users increases. The packet shaper of related art 1 enqueues packets for each user (contractor) into user-specific queues. Because time to decide what queue from which a packet is sent out increases as the number of users increases, high-speed shaping cannot be expected when the shaper serves traffic to many users.

The second problem is that users cannot make efficient use of minimum bandwidth. This problem is explained for the above-mentioned internet 200 in FIG. 2. Traffic from the terminal A 231, terminal B 232, terminal C 233, and terminal D 234 to the terminal E 235 of user E is input to the backbone router B203, when the input traffic changes over time as will be shown in FIG. 9. At this time, the shaper of the backbone router B203 executes shaping to ensure the transmission of the traffic within the minimum bandwidth for user E. If the total sum of the traffic for all users arrived at the backbone router B 203 changes over time as will be shown in FIG. 10, the traffic output from the packet shaper changes as will be shown in FIG. 11. During time ta, the total sum of the traffic for all users falls within the line bandwidth and therefore the traffic to user E is sent out as soon as it is placed in the user-specific queue. During time tb, the bandwidth occupied by the traffic to user E is less than the minimum bandwidth and therefore all the traffic to user E is sent out. During time tc, however, the total sum of the traffic for all users goes beyond the line bandwidth and the bandwidth occupied by the traffic to user E becomes greater than the minimum bandwidth. Therefore, the packets routed to the terminal E of user E are stored in the user-specific queue. If the period of tc is long, enqueued packets become over the maximum queue length and overflowed packets are discarded. Because the packet shaper does not take the importance of packets into consideration, some important packets that the user wants them to surely arrive at the receiving terminal may be discarded and other packets may be transferred to the terminal. The packet shaper of related art 1 may discard some packets that are important for the user and may send other packets to their destinations; in other words, depending on circumstances, users cannot make efficient use of minimum bandwidth. In the following description of the present invention, some packets that are important for the user, that is, the user wants them to surely arrive at the receiving terminal will be referred to as important packets and other packets as unimportant packets.

As described above, it was impossible for the packet shapers of prior art to perform high-speed shaping, while ensuring the transmission of packets to many users within user-specific minimum bandwidth.

Furthermore, the packet shapers of prior art were not designed for efficient use of minimum bandwidth with secure transmission of important packets, resulting in that users could not make efficient use of minimum bandwidth.

As a preferred embodiment of the present invention, the inventor proposes a packet shaper equipped with a packet storage FIFO buffer to store packets, a priority decision means to decide the priority of queuing the packets, and a packet discard control means to judge whether a packet is stored into the packet storage FIFO buffer or discarded, based on the queuing priority of the packet. This packet shaper has a feature that packets routed to their destinations of a plurality of users are stored into the same packet storage FIFO buffer. Because the packet shaper according to the present invention sends out packets output from only one packet storage FIFO buffer 520, it is not necessary to select a buffer to output a packet to send out from among a plurality of buffers and the packet shaper can perform high-speed shaping.

Another example of preferred embodiment of the present invention, the inventor proposes a packet shaper equipped with a priority decision means that basically judges the priority of packets as follows: among packets routed to their destinations of a plurality of users, those packets that fall within the minimum bandwidth guaranteed to each user are taken as priority packets. If the packet shaper receives packets routed to a destination of user in excess of the minimum bandwidth, the above priority decision means decides that important packets predetermined and specified by the user are high priority packets as those taking first priority when being enqueued into the buffer, which is a noticeable feature of the present invention. The packet shaper of the present invention transfers packets, securing important packets from being discarded, so that users can make efficient use of minimum bandwidth.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
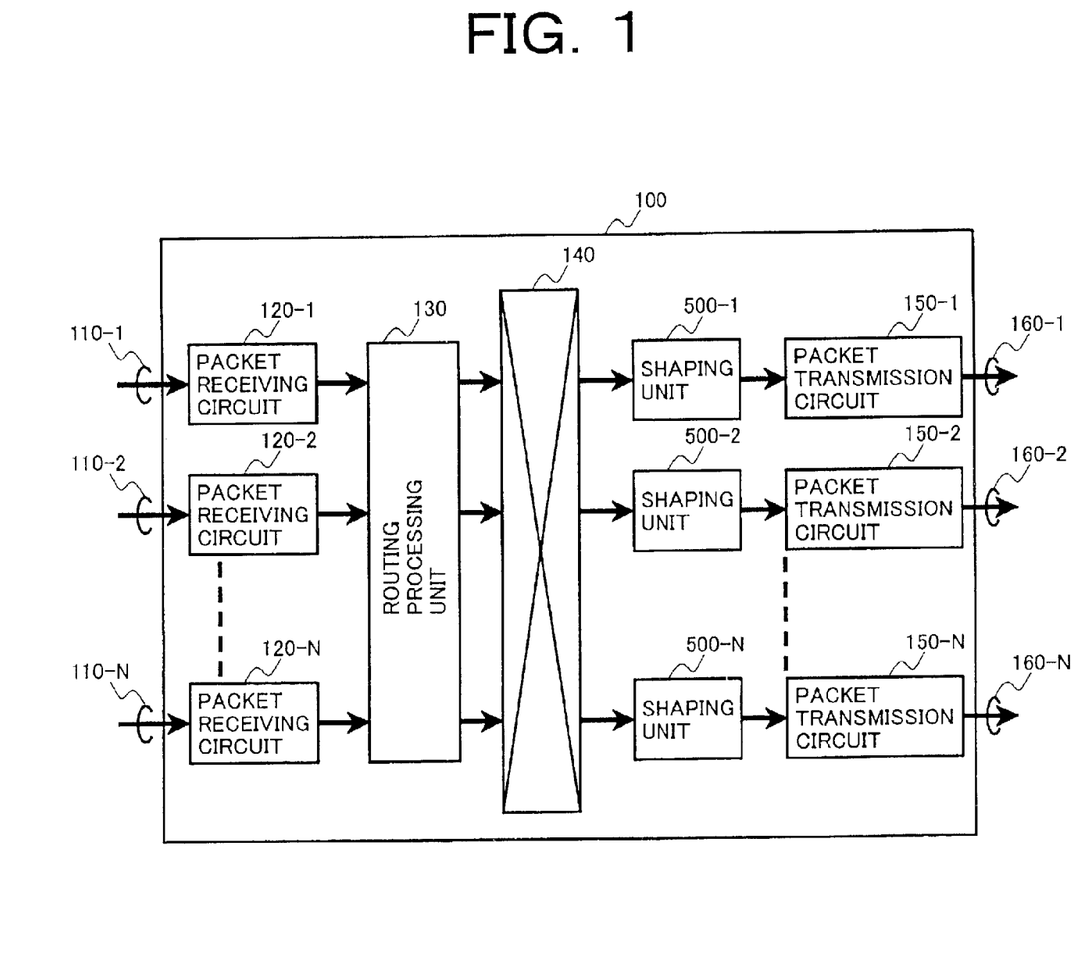
FIG. 1 is a block diagram showing the configuration of a router 100 to which the present invention is applied.

First, the outline operation of a router that is capable of packet shaping by the present invention will be explained with reference to FIGS. 1 to 4. FIG. 1 shows a router 100 to which the present invention is applied. The router 100 consists of N pieces of incoming lines 110-i (where i=1 to N) through which packets are input to the router, packet receiving circuits 120-i that execute packet reception processing, a routing processing unit 130, a packet switching means 140 that executes switching of packets, shaping units 500-j (where j=1 to N), each provided for each output line, packet transmission circuits 150-j that execute transmission processing, and N pieces of output lines 160-j across which packets are sent out.

Figure 3:
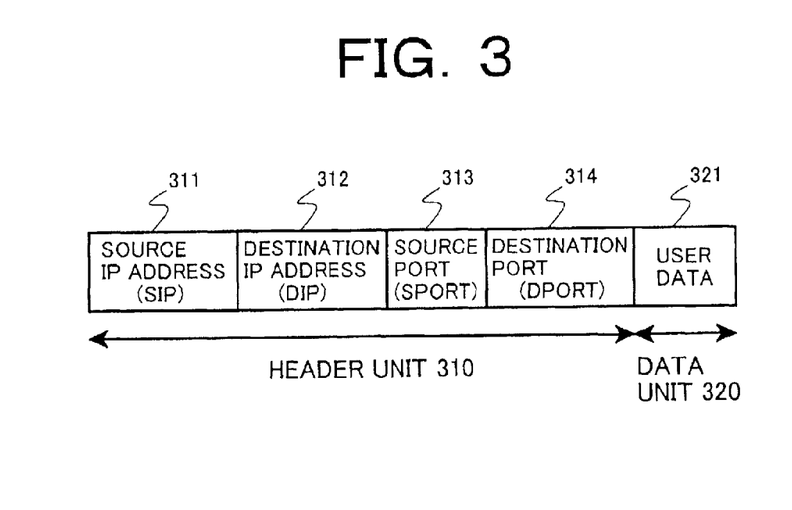
FIG. 3 shows the format of a packet to be transmitted across an internet 200.

FIG. 3 shows an example of the format of a packet to be transmitted across an internet 200. The packet to be transmitted across the internet 200 consists of a header unit 310 and a data unit 320. The header unit essentially contains a Source IP Address (hereinafter abbreviated to "SIP") 311 that is the address of the sender of the packet (the address of the packet sending terminal), a Destination IP Address (hereinafter abbreviated to "DIP") 312 that is the destination address of the packet (the address of the packet receiving terminal), a Source Port (hereinafter abbreviated to "SPORT") 313 that indicates the port of the protocol (or in other words, upper level application) under which the sender machine operates, and a Destination Port (hereinafter abbreviated to "DPORT") 314 that indicates the port of the protocol under which the destination machine operates. The data unit 320 contains user data 321. The header unit 310 may also include information such as Type of Service (TOS) as a service identifier in addition to the above information and processing which will be described later can be executed for additional information in the same way as for the above information.

Figure 4:
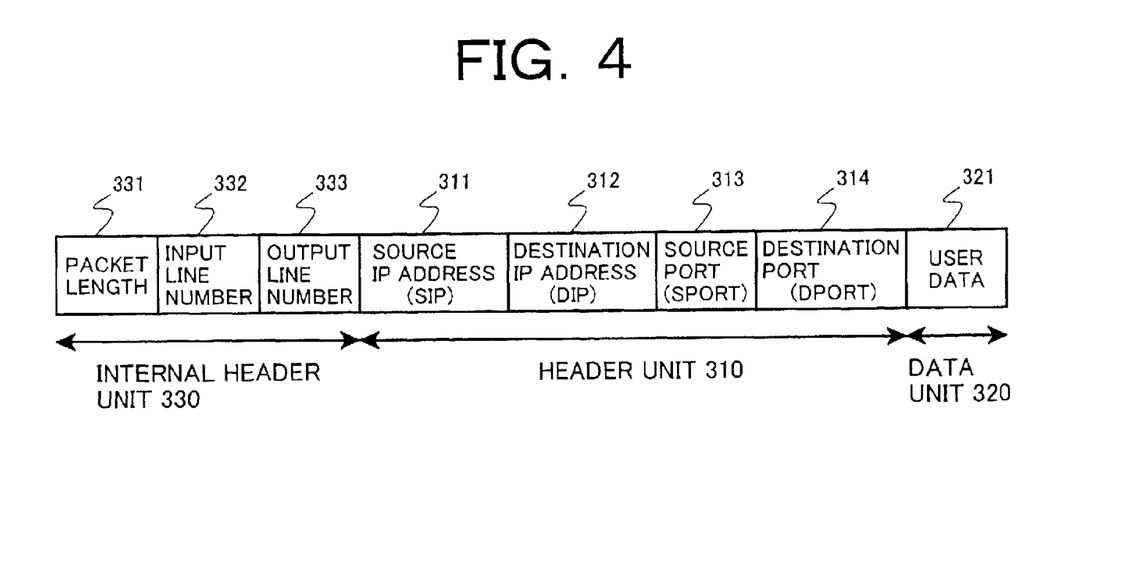
FIG. 4 shows the format of a packet to be handled in the router 100 to which the present invention is applied.

FIG. 4 shows the format of a packet to be handled in the router 100 to which the present invention is applied. The format of a packet to be handled in the router 100 is formed by adding an internal header unit 330 to the format of a packet to be transmitted across the internet 200. This internal header unit 330 contains packet length 331 that indicates the length in bytes of the packet, an incoming line number 332 that is the identifier of the incoming line through which the packet has been input to the router, and an output line number 333 that is the identifier of the output line across which the packet is to be routed to its destination.

The network architecture that the inventor supposed for embodying the present invention is as shown in FIG. 2. In the internet 200 in FIG. 2, the following are assumed. The guaranteed minimum bandwidth service is provided and five terminals (terminal E 235, terminal F 236, terminal G 237, terminal H 238, and terminal I 239) that are directly connected to the edge router B 204 surely receive packets within terminal-specific minimum bandwidth that has been assigned by contract to user E, user F, user G, user H, and user I, respectively. The terminal A 231, terminal B 232, terminal C 233, and terminal D 234 send packets and the terminal E 235, terminal F 236, terminal G 237, terminal H 238, and terminal I 239 receive packets. The line from the backbone router B 203 to the edge router B 204 has the capacity greater than the total sum of the minimum bandwidths assigned by contract to the users but bottlenecks. The router 100 to which the present invention is applied is used as the backbone router B 203 and the shaping units 500-j for the output lines 160-j to the edge router B204 execute shaping to ensure that packets are transmitted to the users within the minimum bandwidth.

When a packet is input to the router 100 to which the present invention is applied through an incoming line 110-i, the packet receiving circuit 120-i adds the internal header unit 330 to the packet, when the length of the packet in bytes is counted and written into the field of packet length 331 (in units of bytes). Furthermore, the line number i of the incoming line 110-i through which the packet has been input is written into the field of incoming line number 332 and then the packet is delivered to the routing processing unit 130. At this time, the output line number 333 field contains a meaningless value. Upon receiving the packet, the routing processing unit 130 determines an output line 160-j across which the packet is to be sent out by referring to the DIP 312, writes the line number j of the output line 160-j into the output line number 333 field, and delivers the packet to the packet switching means 140. The packet switching means 140 executes switching of the packet, according to the output line number 333, and delivers the packet to the shaping unit 500-j per output line. The shaping unit 500-j ensures packet transmission within the user-specific minimum bandwidth and delivers the packet to the packet transmission circuit 150-j. Upon receiving the packet, the packet transmission circuit 150-j removes the internal header unit 330 from the packet header and delivers the packet to the output line 160-j.

Figure 5:
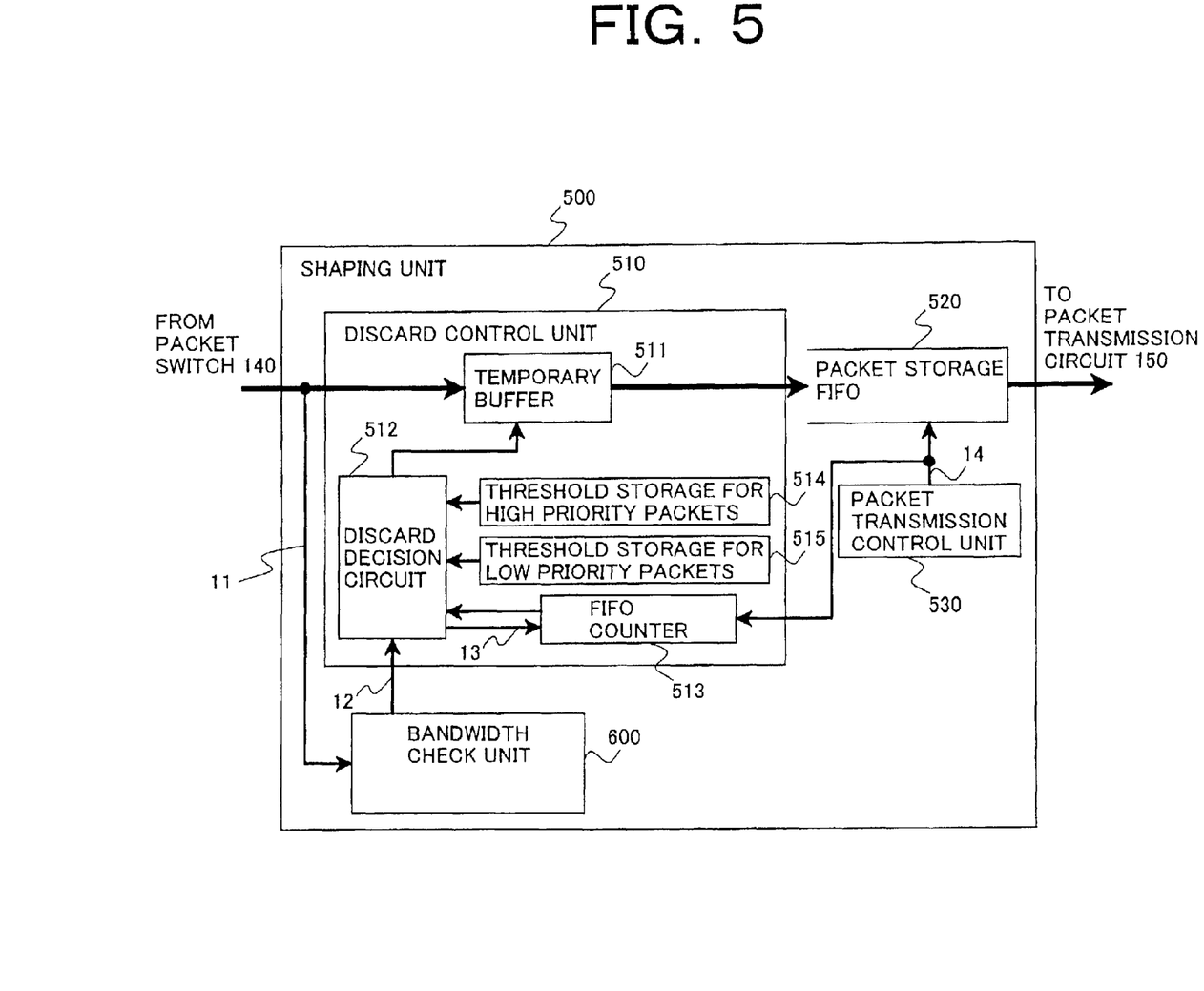
FIG. 5 is a block diagram showing the configuration of a shaping unit 500.

Then, the detailed operation of the shaping unit 500 that comprises a packet shaper of the present invention will be explained below. The block diagram of the shaping unit 500 of the present invention is shown in FIG. 5. The shaping unit 500 primarily consists of a packet storage FIFO buffer 520 to store packets, a packet transmission control unit 530 that sends out packets in order in which the packets have been stored into the packet storage FIFO buffer 520, a discard control unit 510 that controls packets to be enqueued into the packet storage FIFO buffer 520 or discarded, a bandwidth check unit 600 that determines the priority of queuing when storing packets into the packet storage FIFO buffer 520. To explain the present invention, packets for which the bandwidth check unit 600 determines "high" queuing priority are called high priority packets and packets for which the bandwidth check unit 600 determines "low" queuing priority are called low priority packets. If congestion occurs and a large quantity of packets are stored into the packet storage FIFO buffer 520, high priority packets take first priority to be stored into the packet storage FIFO buffer 520.

The discard control unit 510 consists of a temporary buffer 511 to temporarily store packets, a FIFO counter 513 to count the number of packets stored in the packet storage FIFO buffer 520, a means of threshold storage for high priority packets 514 to store a threshold that determines whether a high priority packet is stored into the packet storage FIFO buffer 520 by being compared with the value of the FIFO counter 513, a means of threshold storage for low priority packets 515 to store a threshold that determines whether a low priority packet is stored into the packet storage FIFO buffer 520, and a discard decision circuit 512. The threshold existing in the means of threshold storage for high priority packets 514 is greater than the threshold existing in the means of threshold storage for low priority packets 515.

When a packet is input to the shaping unit from the packet switching means 140, its header unit 310, data unit 320, and internal header unit 330 are all stored into the temporary buffer 511 and its header unit 310 and internal header unit 330 are stored into the bandwidth check unit 600. The bandwidth check unit 600 determines the queuing priority of the packet, based on the information stored into it. The bandwidth check unit 600 checks the input packet per user against the user-specific minimum bandwidth and judges the packet that falls within the minimum bandwidth to be "high priority" and the packet that falls outside the minimum bandwidth to be "low priority." Then, the bandwidth check unit 600 delivers queuing priority 12 comprising the information as the result of such judgment to the discard decision circuit 512. How the bandwidth check unit 600 operates will be detailed later.

The discard decision circuit 512 of the discard control unit 510 decides whether to discard the packet stored in the temporary buffer 511, according to the above queuing priority 12, the value of the FIFO counter 513, the threshold existing in the means of threshold storage for high priority packets 514, and the threshold existing in the means of threshold storage for low priority packets 515. If the queuing priority 12 is "high priority" and the threshold existing in the means of threshold storage for high priority packets 514 is greater than the value of the FIFO counter 513, the discard decision circuit 512 decides to "store" the packet and instructs the temporary buffer 511 to deliver the packet to the packet storage FIFO buffer 520. When the temporary buffer 511 receives the signal of this instruction, it delivers the packet to the packet storage FIFO buffer 520 and the packet is stored into the packet storage FIFO buffer 520.

If the threshold existing in the means of threshold storage for high priority packets 514 is equal to the value of the FIFO counter 513, the discard decision circuit 512 decides to "discard" the packet and does not instruct the temporary buffer 511 to deliver the packet. The temporary buffer 511 overwrites the information contained in the packet remaining as a "discard" with information contained in the next arrived packet. On the other hand, if the queuing priority 12 is "low priority," the discard decision circuit 512 makes a decision, according to the following conditions:

If the threshold existing in the means of threshold storage for low priority packets 515 is greater than the value of the FIFO counter 513, the discard decision circuit 512 decides to "store" the packet.

If the threshold existing in the means of threshold storage for low priority packets 515 is equal to or less than the value of the FIFO counter 513, the discard decision circuit 512 decides to "discard" the packet. The discard decision circuit 512 delivers a discard decision result 13 indicating the result of the decision of the discard decision circuit 512 ("store" or "discard") to the FIFO counter 513. If the discard decision result is "store," the FIFO counter 513 increments its stored packet count by one; if "discard", the counter remains as is.

The packet transmission control unit 530 delivers a packet transmission start signal 14 so that packets will be sent out in order in which they have been stored into the packet storage FIFO buffer 520 within the line bandwidth. Upon receiving this packet transmission start signal, the packet storage FIFO buffer 520 delivers a packet to the packet transmission circuit 150. Upon receiving the packet transmission start signal, the FIFO counter 513 decrements its stored packet count by one. Although the packet transmission control unit 530 delivers the packet transmission start signal 14 so that packets will be sent out within the line bandwidth according to the present embodiment of the invention, packets may be sent out by using a bandwidth less than the line bandwidth set by the network administrator (for example, a half the line bandwidth).

Because the shaping unit 500-j of the present invention sends out packets output from only one packet storage FIFO buffer 520, it is not necessary to select a buffer to output a packet to send out from among a plurality of buffers and therefore the shaping unit can perform high-speed packet shaping.

Figure 9:
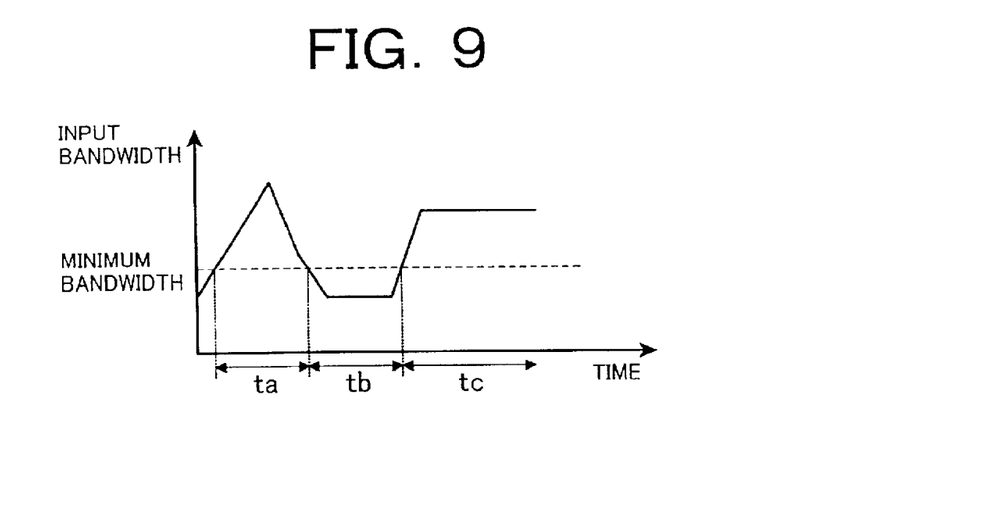
FIG. 9 is a chart showing how the traffic routed to the terminal E 235 changes over time when it is input to the shaping unit 500.
Figure 10:
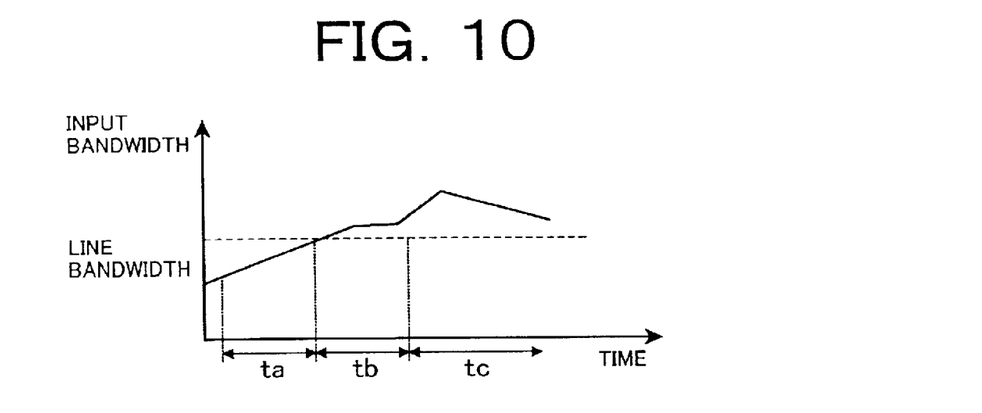
FIG. 10 is a chart showing how the total sum of the traffic for all users changes over time when it is input to the shaping unit 500.
Figure 11:
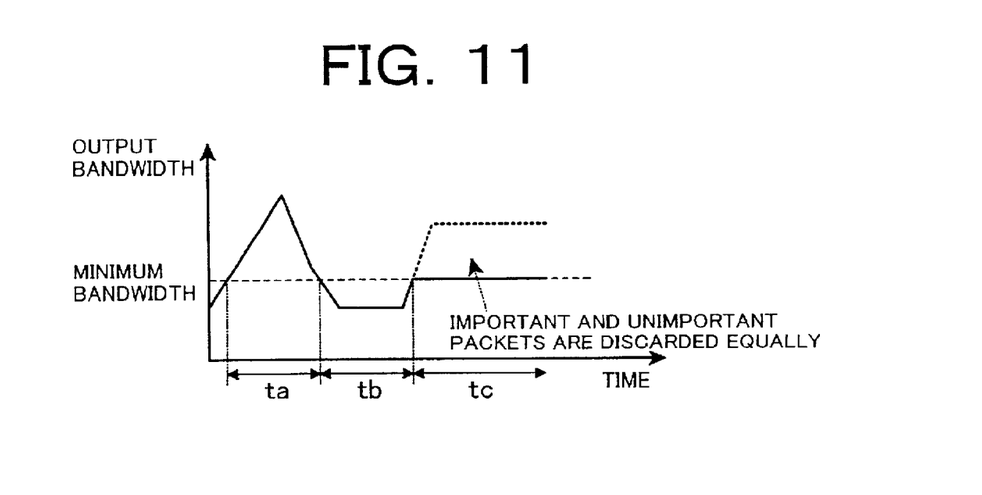
FIG. 11 is a chart showing how the traffic routed to the terminal E 235 changes over time when it is sent out across the output line 160-j.

If the traffic routed to user E (terminal E 235) input to the shaping unit 500-j changes over time as shown in FIG. 9 and the total sum of the traffic for all users input to the shaping unit 500-j changes over time as shown in FIG. 10, the traffic sent out across the output line 160-j and routed to user E changes as shown in FIG. 11. During time ta, the total sum of the traffic for all users falls within the line bandwidth and therefore the packets routed to user E are stored into the packet storage FIFO buffer 520 and sent out. During time tb and time tc, because the total sum of the traffic for all users goes beyond the line bandwidth, incoming packets are too many to be stored into the packet storage FIFO buffer 520 in excess of the threshold existing in the means of threshold storage for low priority packets 515. Consequently, during these periods, low priority packets are not stored, but only high priority packets are stored into the packet storage FIFO buffer 520. Packets output from the packet storage FIFO buffer 520 are sent out within the line bandwidth and high priority packets for all users are enqueued into this buffer, falling within the user-specific minimum bandwidth. Because the total sum of the minimum bandwidths assigned to the users is less than the line bandwidth, high priority packets are stored into the packet storage FIFO buffer 520 without being discarded and sent out across the output line 160-j. During time tb, because the bandwidth occupied by the traffic routed to user E is less than the minimum bandwidth, packets to user E are eventually sent out across the output line 160-j. During time tc, those packets routed to user E that fall within the minimum bandwidth are judged to be high priority packets and sent out across the output line 160-j, but those packets that fall outside the minimum bandwidth are judged to be low priority packets and discarded.

Figure 6:
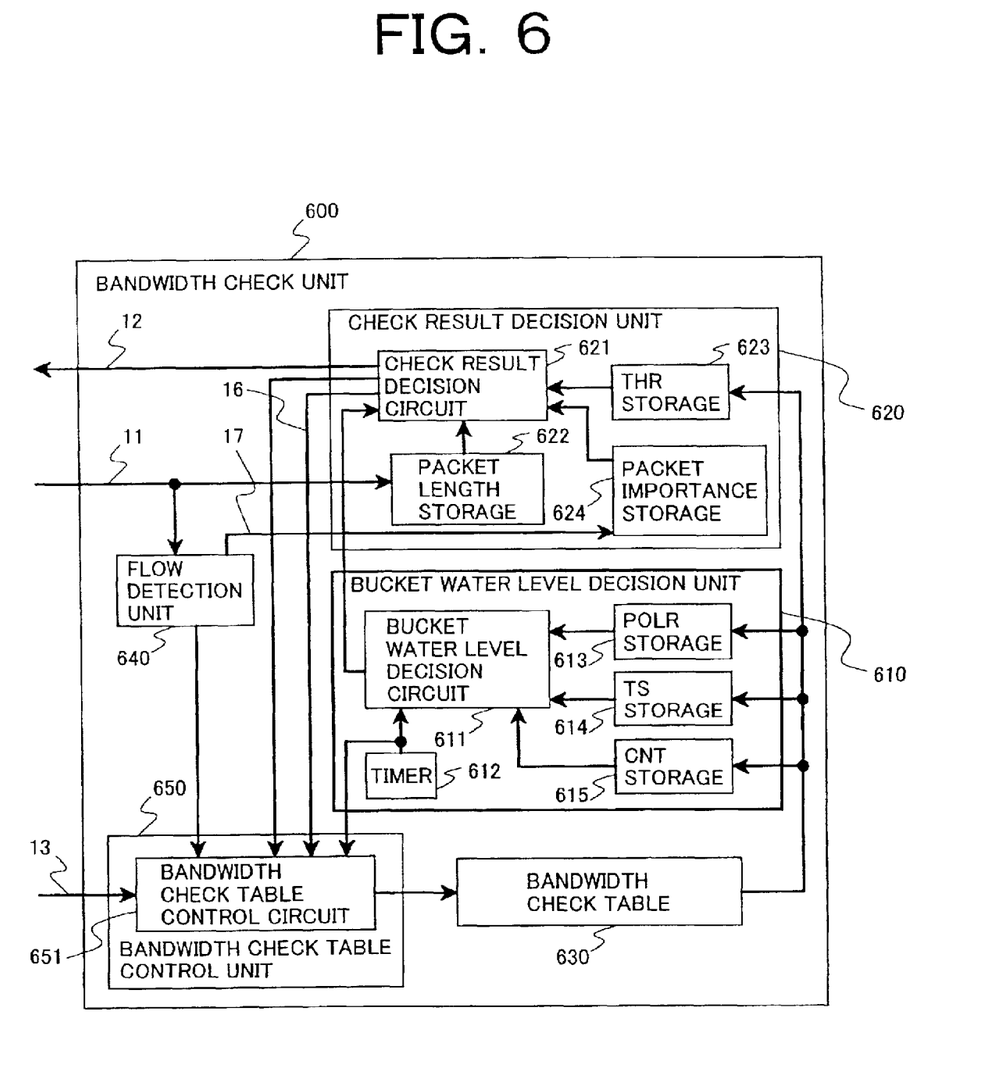
FIG. 6 is a block diagram showing the configuration of a bandwidth check unit 600 that is a component of the present invention.

Then, how the bandwidth check unit 600 operates will be detailed below. During time tc, the bandwidth check unit 600 judges only important packets to be high priority packets. Owing to this function of the bandwidth check unit 600, the shaping unit 500 can secure important packets from being discarded. As the algorithm for supervising packet arrival, extended algorithm based on continuous Leaky Bucket Algorithm that is used for supervising cells of fixed-length packets is used for supervising variable-length packets to check for their arrival within bandwidth. For the information about the Leaky Bucket Algorithm, refer to, for example, the ATM Forum Specification version 4.1, Section 4.4.2. The leaky bucket algorithm is modeled on a leaky bucket with a certain depth. As long as the bucket contains water, some of the water constantly leaks out. When a cell arrives, water as much as one cell is poured into the bucket. The bucket has depth to permit cell delay variation (CDV). Unless the water overflows the bucket, the incoming cell is judged confirming to bandwidth. If the water overflows the bucket, the incoming cell is judged non-conforming to bandwidth. By using a variable quantity of water to be poured into the bucket at cell arrival, bandwidth check, that is, supervising the arrival or incoming of variable-length packets within bandwidth is implemented in the present invention.

FIG. 6 shows a block diagram of the bandwidth check unit 600. The bandwidth check unit 600 primarily consists of a bandwidth check table control unit 650, a bucket water level decision unit 610, a check result decision unit 620, a bandwidth check table 630, and a flow detection unit 640. The flow detection unit 640 determines what flow identifier of each incoming packet by referring to the information contained in the header of the packet. The bandwidth check unit 600 executes bandwidth check by using bandwidth check control information for a specific flow identifier. To explain the present invention, conditions for identifying packets, created by combinations of possible information items contained in the header are termed flow conditions, a series of traffic meeting a flow condition is termed a flow, and identification of a flow by judging what flow condition incoming packets meet is termed flow detection.

Figure 7:
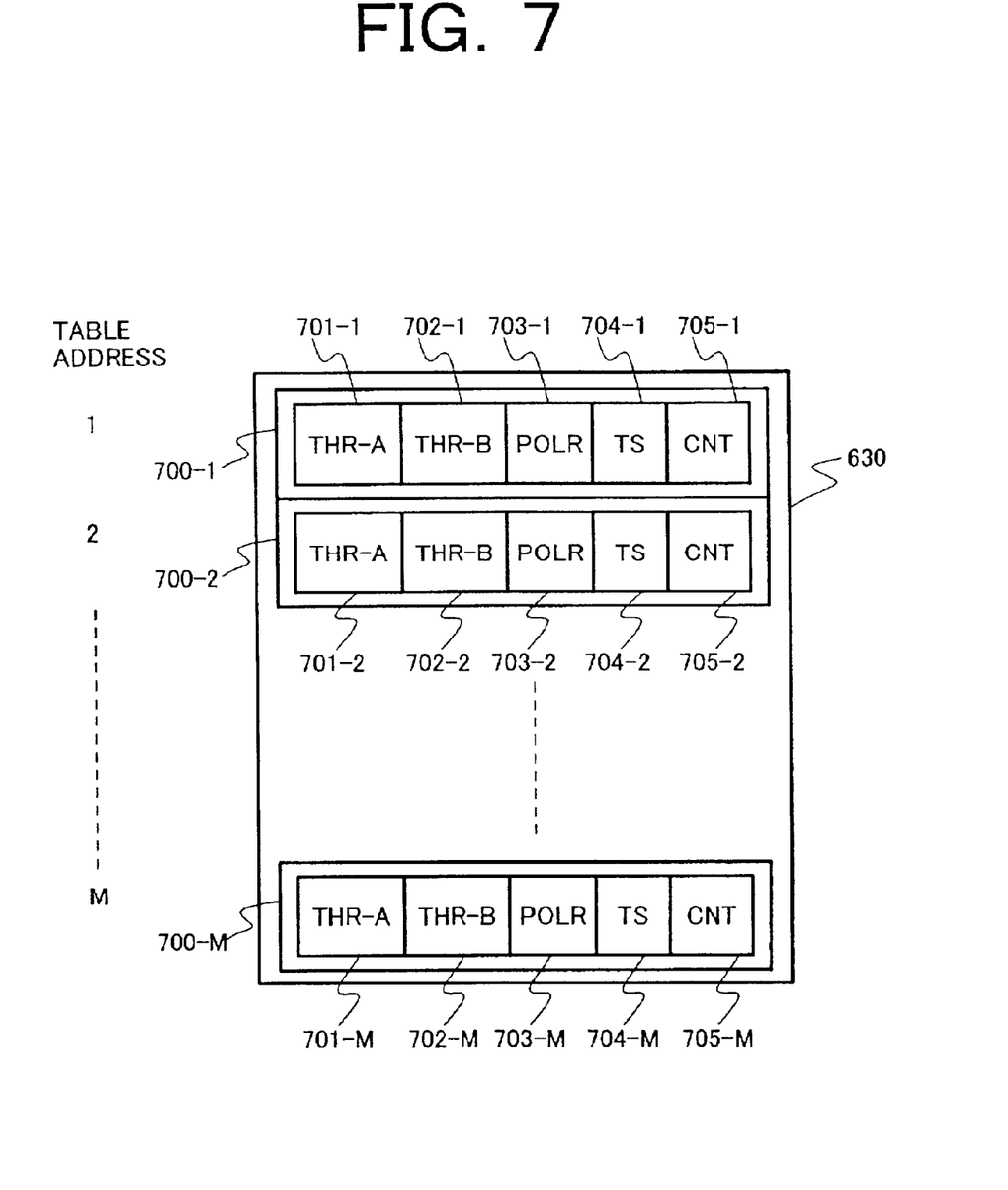
FIG. 7 shows the format of a bandwidth check table 630.

FIG. 7 shows the format of the bandwidth check table 630. The bandwidth check table 630 consists of M sets of bandwidth check control information 700-k (where k=1 to M). The bandwidth check unit 600 executes bandwidth check for one user by using one set of bandwidth check control information 700-k. One set of bandwidth check control information 700-k consists of bucket depth (in bytes) for important packets THR-A (Threshold-A) 701-k, bucket depth (in bytes) for unimportant packets THR-B (Threshold-B) 702-k, a rate (bytes/sec) at which water leaks out of the bucket, representing a check rate, POLR (Policing Rate) 703-k, time (sec) at which water was last poured into the bucket as a packet referring to the same set of bandwidth check control information 700-k (where k=1 to M): TS (Time Stamp) 704-k, and the level of water contained in the bucket at the time TS 704-k CNT (Count) (bytes) 705-k. The relation between the THR-A 701-k and THR-B 702-k representing the bucket depth is such that THR-A 701-k is equal to or greater than THR-B 702-k.

Figure 8:
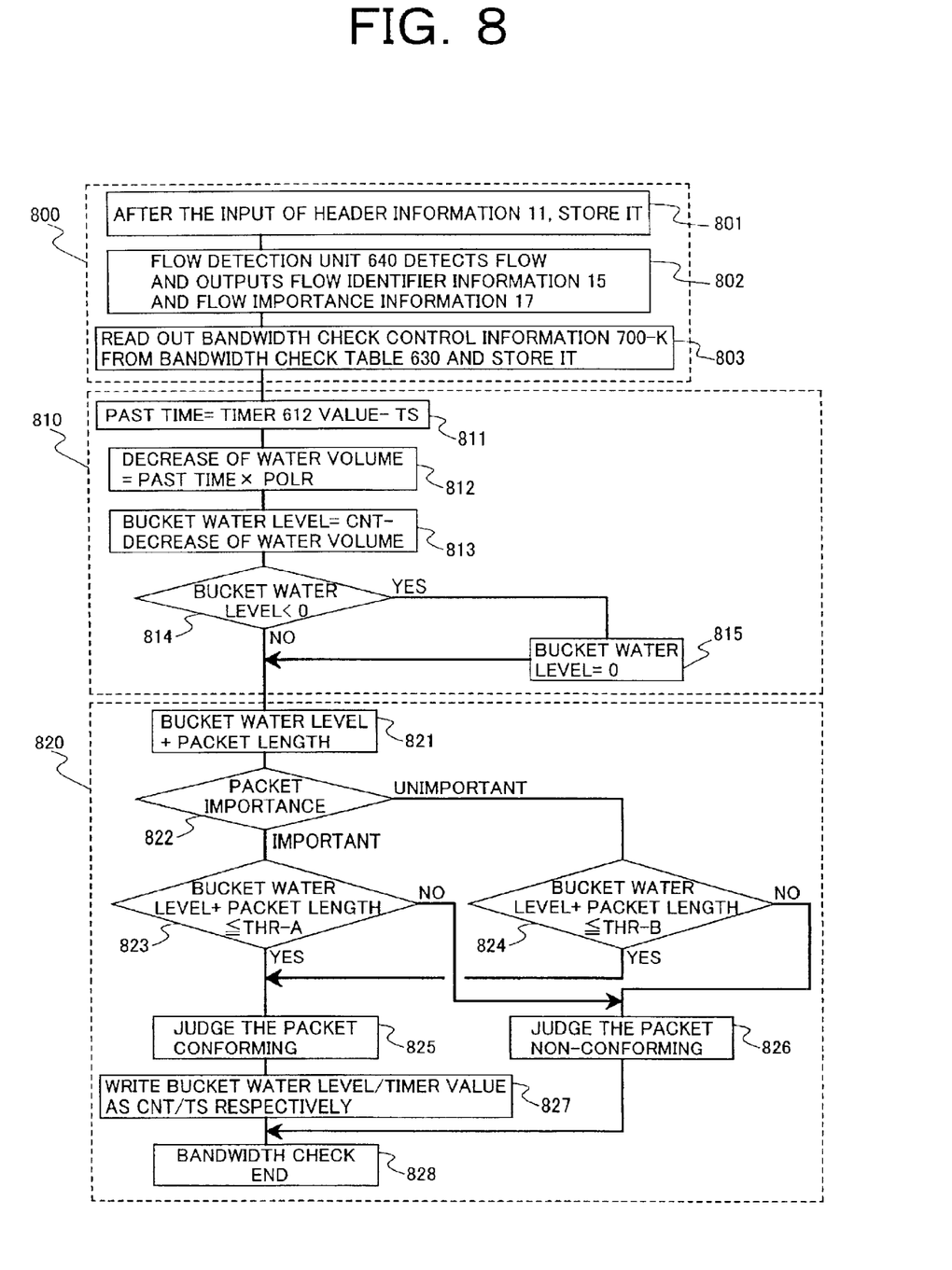
FIG. 8 is a flowchart illustrating the processing of the bandwidth check unit 600 to which the present invention is applied.

FIG. 8 shows a flowchart illustrating the processing of the bandwidth check unit 600. The processing of the bandwidth check unit 600 comprises a bandwidth check start phase 800, a bucket water level decision phase 810, and a check result decision phase 820. The latter two phases are primarily carried out by the bucket water level decision unit 610 and the check result decision unit 620 respectively.

When the bandwidth check unit 600 receives packet header information 11 comprising the header unit 310 and the internal header unit 330, the packet length 331 is stored into the packet length storage 622 of the check result decision unit 620 and the incoming line number 332, output line number 333, SIP 311, DIP 312, SPORT 313, and DPORT 314 are stored into the flow detection unit 640 (step 801). In step 802, the flow detection unit 640 detects what flow the packet belongs to, based on the stored information. Specifically, the flow detection unit 640 judges what flow identifier of the packet existing in the temporary buffer 511 and whether the packet is important or unimportant. Then, the flow detection unit 640 delivers flow identifier information 15 comprising the detected flow identifier to the bandwidth check table control circuit 651 of the bandwidth check table control unit 650 and packet importance information 17 indicating an important/unimportant packet to the packet importance storage 624 of the check result decision unit 620.

The above flow identifier information 15 is a flow identifier corresponding to one of the users. In the case of the internet 200 shown in FIG. 2, the flow detection unit 640 detects a flow identifier by identifying a user by referring to the IP address (DIP 312) of one of the terminal E 235, terminal F 236, terminal G 237, terminal H 238, and terminal I 239 and judges whether the packet is important or unimportant by identifying an application by referring to the port number of TCP (SPORT 313 and DPORT 314).

Upon receiving the flow identifier information, the bandwidth check table control circuit 651 transmits the address associated with the flow identifier in the bandwidth check table 630 and reads the set of bandwidth check control information 700-k stored at that address and stores THR-A 701-k and THR-B 702-k of the information set into the THR storage 623 of the check result decision unit 620 and POLR 703-k, TS 704-k, and CNT 705-k of the information set into the POLR storage 613, TS storage 614, and CNT storage 615 of the bucket water level decision unit 610, respectively (step 803).

In the bucket water level decision phase 810, the bucket water level decision unit 610 measures what level of water the bucket contains (how much water in the bucket) immediately before the packet input. First, the bucket water level decision circuit 611 calculates the difference between the value of the timer 612 (in units of sec) and the TS (sec) 704-k stored in the TS storage 614 to determine time (sec) elapsed after water was last poured into the bucket (step 811). Then, the above circuit 611 multiples the time elapsed (sec) by the rate of POLR (bytes/sec) 703-k to determine how much of water has leaked out (bucket water decrease) after water was last poured into the bucket (step 812). Furthermore, the above circuit 611 subtracts the bucket water decrease from the value of CNT 705-k stored in the CNT storage 615 to measure what level of water in the bucket immediately before the packet input (step 813). Decision is made as to whether the bucket water level is positive or negative (step 814). If the result of decision is negative, correct the bucket water level to "0" (the bucket is empty) (step 815).

In the check result decision phase 820, the check result decision circuit 621 of the check result decision unit 620 judges whether water corresponding to the packet existing in the temporary buffer 511 can be put into the bucket and determines the priority of the packet. First, the check result decision circuit 621 adds the packet length (bytes) to the bucket water level (bytes) measured in the above bucket water level decision phase 810 (step 821). Then, the packet importance information 17 delivered from the flow detection unit 640 is stored into the packet importance storage 624. According to the stored packet importance information 17, the bandwidth check processing branches (step 822). If the above stored information is "important," the check result decision circuit 621 compares the sum resulting from the addition in the step 821 with the bucket depth for important packets THR-A 701-k stored in the THR storage 623 to determine which is larger (step 823). If the sum of bucket water level plus packet length is larger than the value of THR-A 701-k, that is, water overflows the bucket, the above circuit 621 judges the packet stored in the temporary buffer 511 non-conforming to bandwidth and delivers bandwidth check result information 18 indicating "non-conforming" to the bandwidth check table control circuit 651 of the bandwidth check table control unit 650 and queuing priority 12 indicating "low priority" to the discard decision circuit 512 (step 826). If the sum of bucket water level plus packet length is equal to or smaller than the value of THR-A 701-k, the above circuit 621 judges the incoming packet conforming to bandwidth and delivers bandwidth check result information 18 indicating "conforming" to the bandwidth check table control circuit 651, queuing priority 12 indicating "high priority" to the discard decision circuit 512 of the discard decision unit 510, and the sum of "bucket water level plus packet length" as bucket water level information 16 to the bandwidth check table control circuit 651 (step 825). If the packet importance information referenced in the step 822 is "unimportant," the above circuit 621 compares the sum resulting from the addition in the step 821, that is, the sum of bucket water level plus packet length with the bucket depth for unimportant packets THR-B 702-k stored in the THR storage 623 to determine which is larger (step 824). If the sum of bucket water level plus packet length is equal to or smaller than the value of THR-B 702-k, the above step 825 is executed. If the sum of bucket water level plus packet length is larger than the value of THR-B 702-k, the above step 826 is executed.

Upon receiving the bandwidth check result information 18 indicating "confirming," the bandwidth check table control circuit 651 overwrites the CNT 705-k and the TS 704-k at the currently accessed address in the bandwidth check table with the received bucket water level information 16 and the value of the timer 612 as the bucket water level immediately after the bandwidth check and the packet arrival time, respectively (step 827). When receiving bandwidth check result information 18 indicating "non-confirming," the bandwidth check table control circuit 651 does not execute the above step 827. When the above processing has been finished, bandwidth check terminates (step 828).

Figure 12:
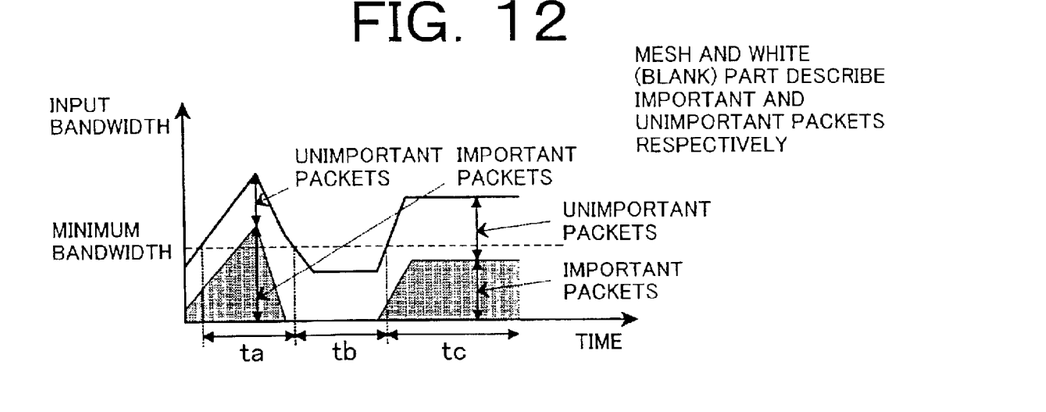
FIG. 12 is a chart showing how important and unimportant packets that constitute the traffic routed to the terminal E 235 change over time when they are input to the shaping unit 500.
Figure 13:
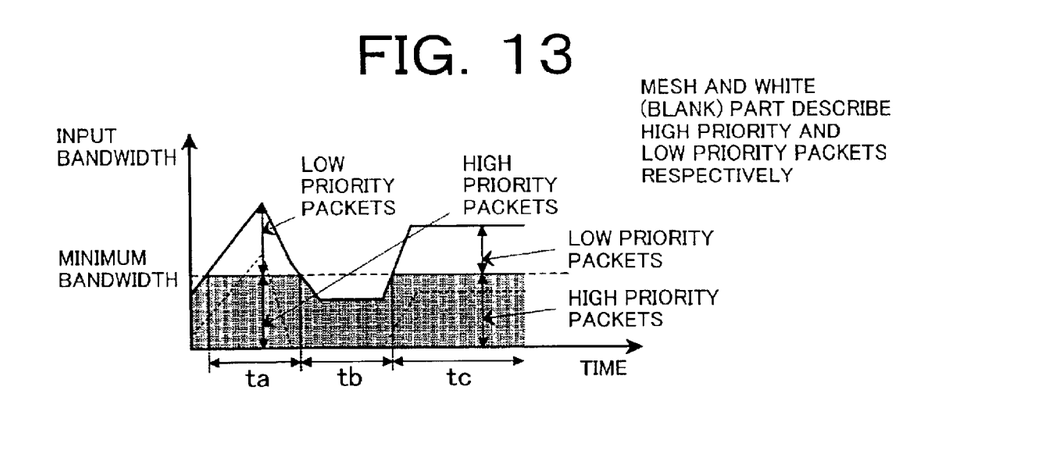
FIG. 13 is a chart showing how traffic judged "high priority" and traffic judged "low priority" by the judgment of the bandwidth check unit 600 change over time.

The steps 822 and 824 are proper to the present invention. The bandwidth check unit 600 holds two bucket depth thresholds THR-A 701-k and THR-B 702-k and judges only important packets to be high priority packets by executing the steps 822, 823 and 824. Consider how important and unimportant packets constitute the traffic routed to user E with reference to FIG. 12. In this case, the result of decision of the bandwidth check unit 600 is as shown in FIG. 13 where the mesh part denotes high priority packets and the blank part denotes low priority packets. During time tb, because the incoming packets fall with the minimum bandwidth, water is not accumulated in the bucket and all packets are judged "high priority." During time ta and tc, however, the incoming packets go outside the minimum bandwidth and thus water is accumulated up to and beyond the bucket depth for unimportant packets THR-B 702-k. As a result, unimportant packets are not stored into the bucket as they are judged "low priority," whereas only important packets are stored into the bucket as they are judged "high priority."

Figure 14:
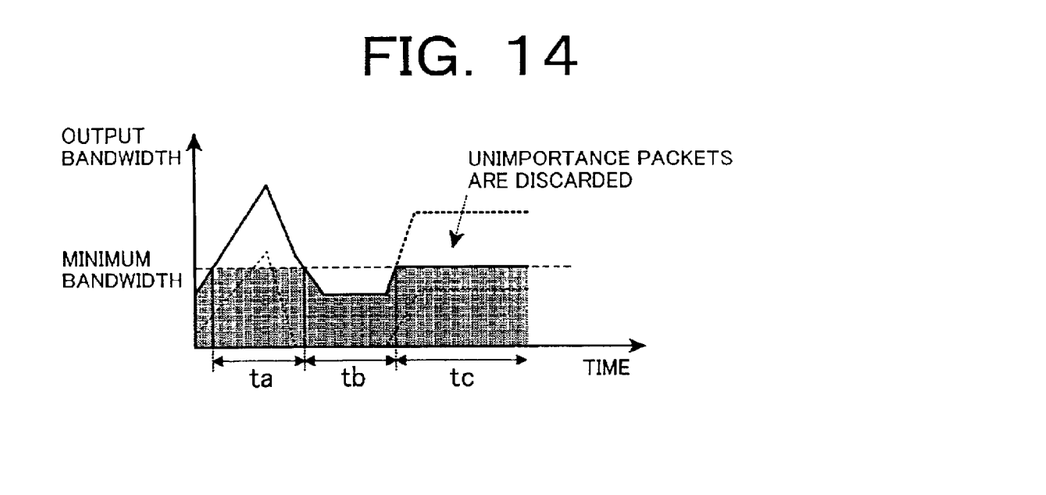
FIG. 14 is a chart showing how the traffic routed to the terminal E 235 changes over time when it is sent out across the output line 160-j.

How the traffic is sent out across the output line 160-j is shown in FIG. 14. During time ta, the total sum of the traffic for all users falls within the line bandwidth (see FIG. 10) and therefore the packets routed to user E are sent out as soon as they are stored into the packet storage FIFO buffer 520. During time tc, however, the total sum of the traffic for all user goes beyond the line bandwidth and therefore incoming packets become too many to be stored into the packet storage FIFO buffer 520 in excess of the threshold existing in the means of threshold storage for low priority packets 515. Consequently, during this period, low priority packets are not stored, but only high priority packets are stored into the packet storage FIFO buffer 520. Because packets output from the packet storage FIFO buffer 520 are sent out within the line bandwidth and incoming high priority packets fall within the line bandwidth, high priority packets are stored into the packet storage FIFO buffer 520 without being discarded and eventually sent out across the output line 160-j. Thus, all important packets routed to user E are sent out across the output line 160-j. During time tb, because all packets routed to user E are judged high priority packets, they are sent out across the output line 160-j.

As explained above, the bandwidth check unit 600 of the shaping unit 500 judges only important packets to be high priority packets and the discard control unit 510 decides to store these high priority packets into the packet storage FIFO buffer 520 as those taking the first priority, so that the shaping unit 500 can transfer important packets to their destinations in security.

How the router 100 operates was discussed hereinbefore. If the present invention is applied to an ATM switch and a frame relay switch, the header unit 310 contains a connection identifiers such as VPI/VCI and DLCI and discard priority information such as CLP and DE. Accordingly, the routing processing unit 130 determines an output line 160-j across which the incoming packet is sent out by referring to the connection identifier instead of the DIP 312. The flow detection unit 640 executes flow detection by using the connection identifier and discard priority information instead of the SIP 311, DIP 312, SPORT 313, and DPORT 314.

As explained above, the router 100 equipped with the shaping unit 500 can perform high-speed packet shaping for many users, ensuring packet transmission within user-specific minimum bandwidth. By using such router 100, the network administrator can provide many users with the guaranteed minimum bandwidth service in a high-speed network.

Furthermore, the router 100 equipped with the shaping unit 500 can perform packet shaping in such a manner that it secures important packets from being discarded and makes efficient use of minimum bandwidth. By using such router 100, the network administrator can provide users with a "service to make efficient use of minimum bandwidth" for secure transmission of important packets for users.

The present invention is not limited to the above embodiments and various changes and modifications can be made within the spirit and scope of the present invention. Therefore, to appraise the public of the scope of the present invention, the following claims are made.

What is claimed is:

1. A packet shaper ensuring that packets falling within minimum bandwidth are transmitted to their destinations comprising:

one buffer to store packets;

a buffer output control means to output packets in order in which the packets have been stored into said buffer;

a priority decision means to decide what queuing priority of a packet when storing packets into said buffer; and a discard control means to judge whether a packet is stored into said buffer or discarded, based on said queuing priority, wherein:

said priority decision means comprising:

a flow detection unit to detect a flow consisting of a series of packets and determine what flow identifier of said flow by referring to the information contained in the packet header;

a bandwidth check table to hold one entry or a plurality of entries comprising bandwidth check control information which is control information for supervising packet arrival within bandwidth;

a bandwidth check table control means to read an entry at address associated with said flow identifier from said bandwidth check table; and a check result decision means to determine queuing priority, based on the bandwidth check control information in the entry read by said bandwidth check table control means, the value of a timer indicating current time, and packet length in the packet header, wherein:

said flow detection unit determines importance of packets of said flow in addition to said flow identifier and said check result decision means determines queuing priority, based on said importance besides said bandwidth check control information, said value of a timer indicating current time, and said packet length in the packet header.

2. A packet shaper according to claim 1, further comprising:

a threshold storage means for high priority packets to store an upper limit (threshold) of said buffer for storing high priority packets, the upper limit to which said discard control means refers when judging whether to store a packet given "high priority" of the queuing priority or discard it;

a threshold storage means for low priority packets to store an upper limit (threshold) of said buffer for storing low priority packets, the upper limit to which said discard control means refers when judging whether to store a packet given "low priority" of the queuing priority or discard it; and a counter that counts the number of packets stored in said buffer.

3. A packet shaper ensuring that packets falling within minimum bandwidth are transmitted to their destinations comprising:

one buffer to store packets;

a buffer output control means to output packets in order in which the packets have been stored into said buffer;

a priority decision means to decide what queuing priority of a packet when storing packets into said buffer; and a discard control means to judge whether a packet is stored into said buffer or discarded, based on said queuing priority, wherein:

said priority decision means comprising:

a flow detection unit to detect a flow consisting of a series of packets and determine what flow identifier of said flow by referring to the information contained in the packet header;

a bandwidth check table to hold one entry or a plurality of entries comprising information items of bucket depth, bandwidth, last packet arrival time, and bucket water level at the last packet arrival which are control information for supervising packet arrival within bandwidth;

a bandwidth check table control means to read an entry at address associated with said flow identifier from said bandwidth check table;

a bucket water level decision means to calculate a bucket water level immediately before the bandwidth check from the read information items of bandwidth, last packet arrival time, and bucket water level at the last packet arrival, and the value of a timer indicating current time; and a check result decision means to determine queuing priority, based on said bucket water level immediately before the bandwidth check, packet length in the packet header, and bucket depth information, wherein:

said flow detection unit determines importance of packets of said flow in addition to said flow identifier, said bandwidth check table holds a plurality of bucket depths as said bucket depth information, and said check result decision means determines queuing priority, based on said importance besides said bucket water level immediately before the bandwidth check, said packet length in the packet header, and said bucket depth information.

4. A packet shaper according to claim 3, further comprising:
- a threshold storage means for high priority packets to store an upper limit (threshold) of said buffer for storing high priority packets, the upper limit to which said discard control means refers when judging whether to store a packet given "high priority" of the queuing priority or discard it;
- a threshold storage means for low priority packets to store an upper limit (threshold) of said buffer for storing low priority packets, the upper limit to which said discard control means refers when judging whether to store a packet given "low priority" of the queuing priority or discard it; and
- a counter that counts the number of packets stored in said buffer.

5. A packet shaper comprising:
- a packet storage FIFO buffer to store packets;
- a priority decision means to decide what queuing priority of said packets; and
- a discard control unit to judge whether a packet is stored into said packet storage FIFO buffer or discarded, based on said queuing priority,
- wherein said discard control unit holds a threshold setting for low priority packets to be referred to when judging whether to store a low priority packet into said packet storage FIFO buffer or discard it,
- wherein said priority decision means judges whether packets for a plurality of users fall within user-specific bandwidth within which packet transmission is ensured and those packets that fall within the user-specific bandwidth to be high priority packets,
- wherein, if received packets for a user go outside the user-specific bandwidth, said priority decision means gives priority to important packets predetermined by said user and determines that these packets are high priority packets.

6. A packet shaper according to claim 5, wherein the discard control unit holds a threshold setting for high priority packets to be referred to when judging whether to store a high priority packet into said packet storage FIFO buffer or discard it.

7. A packet shaper according to claim 5, further comprising a counter that counts the number of packets stored in said packet storage FIFO buffer.

8. A packet shaper according to claim 5, wherein said packets for a plurality of users are stored into said same packet storage FIFO buffer.

9. A packet shaper ensuring that packets falling within minimum bandwidth are transmitted to their destinations comprising:
- one packet storage FIFO buffer to store packets;
- a buffer output control means to output packets in order in which the packets have been stored into said packet storage FIFO buffer;
- a priority decision means to decide what queuing priority of a packet when storing packets into said packet storage FIFO buffer; and
- a discard control unit to judge whether a packet is stored into said packet FIFO buffer or discarded, based on said queuing priority,
- wherein said priority decision means comprising:
- a flow detection unit to detect a flow consisting of a series of packets and determine what flow identifier of said flow by referring to the information contained in the packet header;
- a bandwidth check table to hold one entry or a plurality of entries comprising bandwidth check control information which is control information for supervising packet arrival within bandwidth;
- a bandwidth check table control means to read an entry at address associated with said flow identifier from said bandwidth check table; and
- a check result decision means to determine queuing priority, based on the bandwidth check control information in the entry read by said bandwidth check table control means, the value of a timer indicating current time, and packet length in the packet header,
- wherein said flow detection unit determines importance of packets of said flow in addition to said flow identifier and said check result decision means determines queuing priority, based on said importance besides said bandwidth check control information, said value of a timer indicating current time, and said packet length in the packet header.

10. A packet shaper according to claim 9, wherein said discard control unit comprising:
- a threshold storage means for high priority packets to store an upper limit (threshold) of said packet storage FIFO buffer for storing high priority packets, the upper limit to which the discard control unit refers when judging whether to store a packet given "high priority" of the queuing priority or discard it;
- a threshold storage means for low priority packets to store an upper limit (threshold) of said buffer for storing low priority packets, the upper limit to which the discard control unit refers when judging whether to store a packet given "low priority" of the queuing priority or discard it; and
- a counter that counts the number of packets stored in said packet storage FIFO buffer.

11. A packet shaper ensuring that packets falling within minimum bandwidth are transmitted to their destinations comprising:
- one packet storage FIFO buffer to store packets;
- a buffer output control means to output packets in order in which the packets have been stored into said packet storage FIFO buffer;
- a priority decision means to decide what queuing priority of a packet when storing packets into said packet storage FIFO buffer; and
- a discard control unit to judge whether a packet is stored into said packet FIFO buffer or discarded, based on said queuing priority,
- wherein said priority decision means comprising:
- a flow detection unit to detect a flow consisting of a series of packets and determine what flow identifier of said flow by referring to the information contained in the packet header;
- a bandwidth check table to hold one entry or a plurality of entries comprising information items of bucket depth, bandwidth, last packet arrival time, and bucket water level at the last packet arrival which are control information for supervising packet arrival within bandwidth;
- a bandwidth check table control means to read an entry at address associated with said flow identifier from said bandwidth check table;

a bucket water level decision means to calculate a bucket water level immediately before the bandwidth check from the read information items of bandwidth, last packet arrival time, and bucket water level at the last packet arrival, and the value of a timer indicating current time; and a check result decision means to determine queuing priority, based on said bucket water level immediately before the bandwidth check, packet length in the packet header, and bucket depth information, wherein said flow detection unit determines importance of packets of said flow in addition to said flow identifier, said bandwidth check table holds a plurality of bucket depths as said bucket depth information, and said check result decision means determines queuing priority, based on said importance besides said bucket water level immediately before the bandwidth check, said packet length in the packet header, and said bucket depth information.

12. A packet shaper according to claim 11, wherein said discard control unit comprising:

a threshold storage means for high priority packets to store an upper limit (threshold) of said packet storage FIFO buffer for storing high priority packets, the upper limit to which the discard control unit refers when judging whether to store a packet given "high priority" of the queuing priority or discard it;

a threshold storage means for low priority packets to store an upper limit (threshold) of said buffer for storing low priority packets, the upper limit to which the discard control unit refers when judging whether to store a packet given "low priority" of the queuing priority or discard it; and a counter that counts the number of packets stored in said packet storage FIFO buffer.

* * * * *